Jan. 12, 1937.  C. L. SIMON  2,067,863
HOSIERY TESTING APPARATUS
Filed Feb. 20, 1934   5 Sheets-Sheet 1

Inventor
CHARLES L. SIMON
By Leonard L. Kalish
Attorney

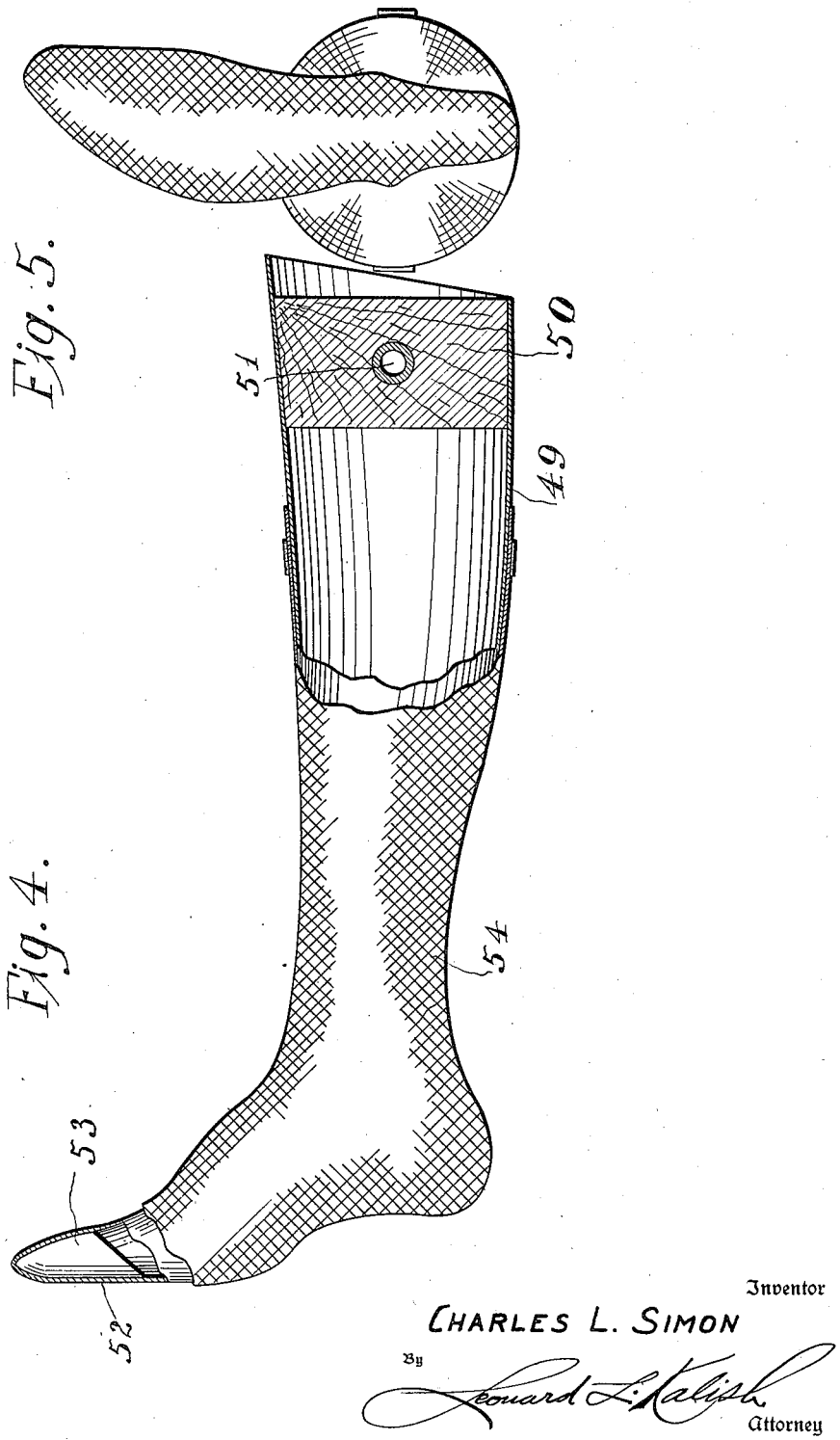

Jan. 12, 1937.     C. L. SIMON     2,067,863
HOSIERY TESTING APPARATUS
Filed Feb. 20, 1934     5 Sheets-Sheet 3
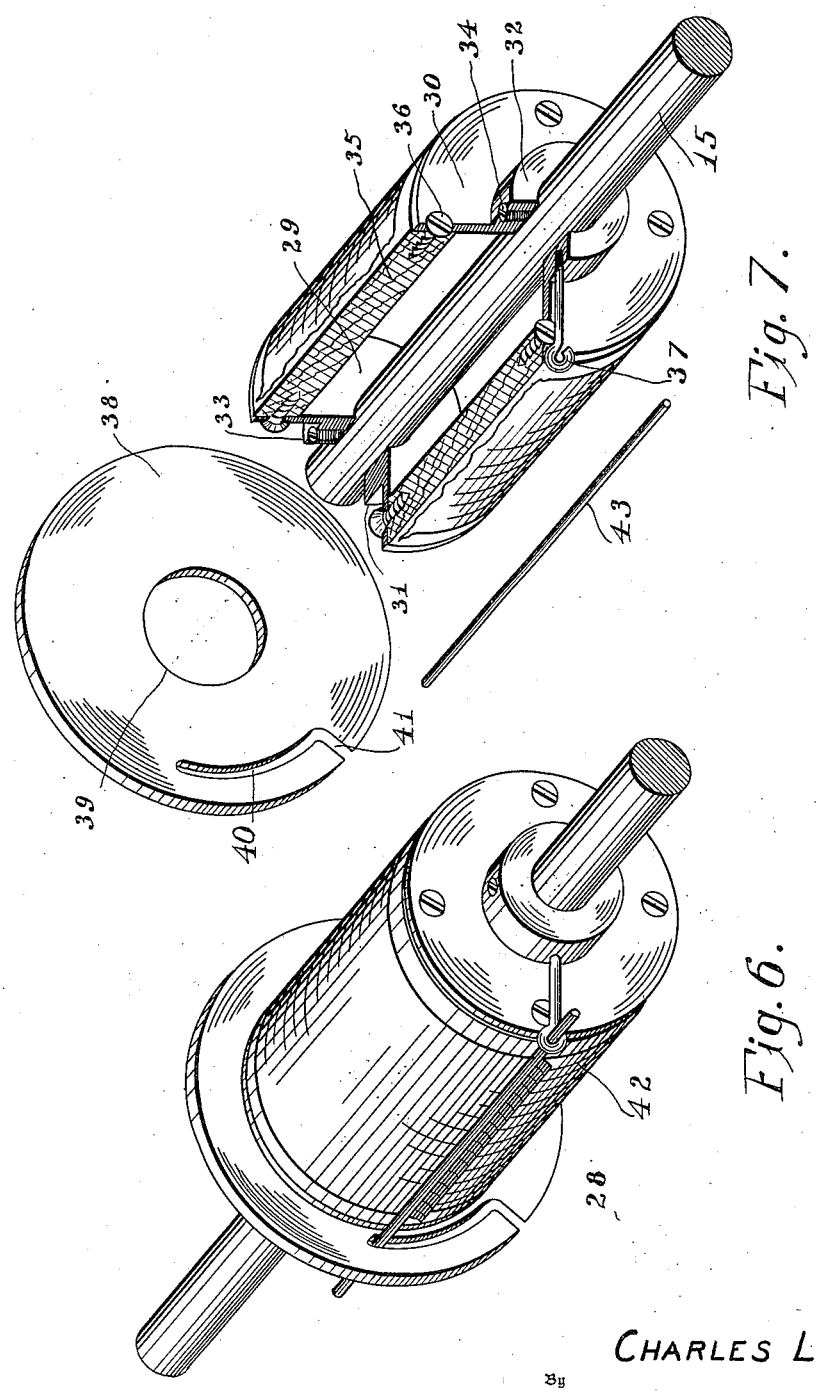
Inventor
CHARLES L. SIMON
By
Leonard L. Kalish
Attorney

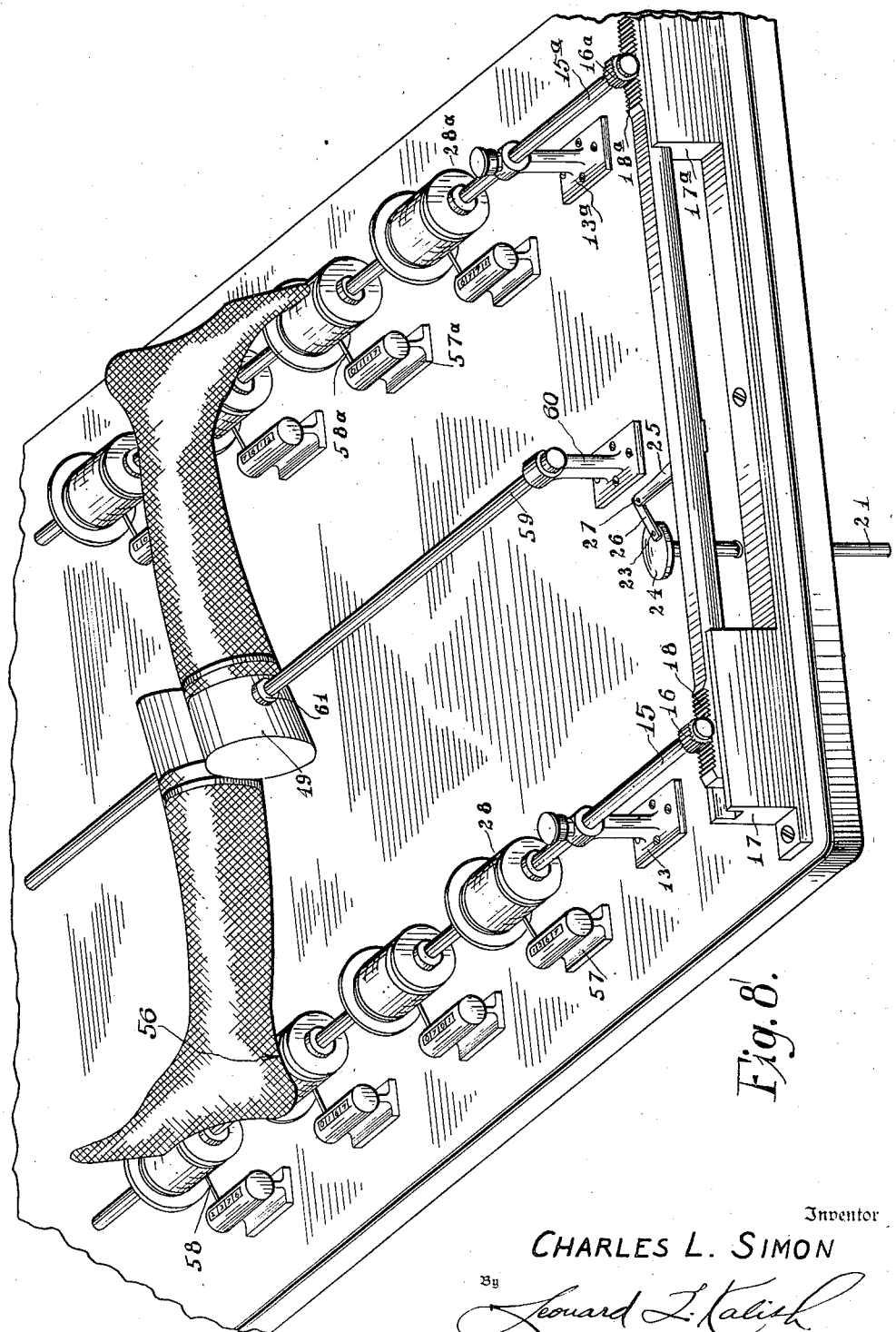

Patented Jan. 12, 1937

2,067,863

UNITED STATES PATENT OFFICE 2,067,863

HOSIERY TESTING APPARATUS

Charles L. Simon, Elkins Park, Pa., assignor to Industrial By-Products and Research Corporation, Philadelphia, Pa., a corporation of Delaware Application February 20, 1934, Serial No. 712,259

9 Claims. (Cl. 73—51)

My invention relates to a new and useful hosiery testing apparatus, and it relates more particularly to apparatus for testing the wearing qualities of hosiery.

The object of my invention is to provide means whereby the wearing qualities or the durability of hosiery may be determined with sufficient reliance to permit the use of such tests as a basis of valuation of hosiery.

A further object of my invention is to provide apparatus whereby hosiery may be subjected to abrasion, and for determining the extent of the abrasion required to rub through or wear through the fabric of the hosiery.

With the above and other objects in view which will appear more fully from the following detailed description and accompanying drawings, my invention consists of means for supporting hosiery on a series of leg forms, providing suitable resilient backing for the fabric of the hosiery at the test points, preferably the toe, and the back of the heel, providing an oscillatory drum or cylindrical segment having an abrasive surface formed of fabric similar to shoe-lining, as for instance, duck or canvas, or other abrasive surface, and providing means whereby the two opposite test points of the hose may be alternately maintained in contact with the oscillatory abrasive drums or cylinders, with the contact pressure maintained relatively constant and with the hosiery and the mounting form remaining generally stationary during the abrasive operation, and whereby the extent or the amount of the abrasion required for wearing through, may be gauged or determined.

My invention further consists of other novel features of construction which will appear more fully hereinafter.

For the purpose of illustrating my invention, I have shown in the accompanying drawings, forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts:

Figure 4 represents a front elevational view, partly in section, of a leg form or hosiery maintaining element of the apparatus embodying my invention.

Figure 5 represents a bottom plan view of the same.

Figure 6 represents a perspective view of one of the abrasive drums or cylindrical segments in the assembled condition.

Figure 7 represents a similar perspective view, partly in section, and partly dismantled, showing the component parts of the abrasive drum or cylinder.

Figure 8 represents a perspective view of another embodiment of my invention.

Figure 1:
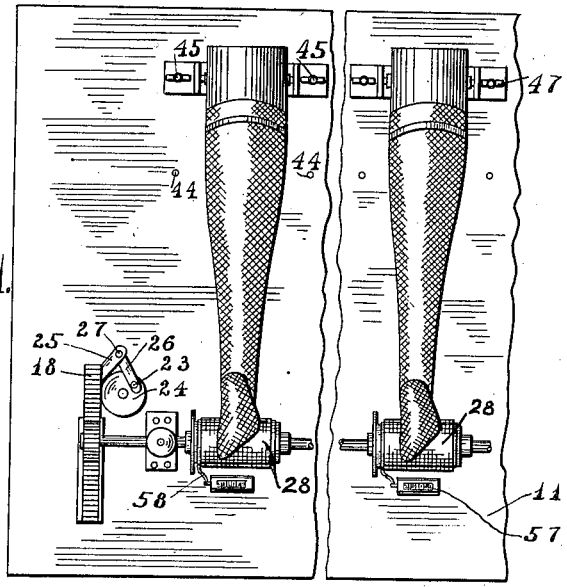
Figure 1 represents a top plan view of testing apparatus illustrating one embodiment of my invention.
Figure 3:
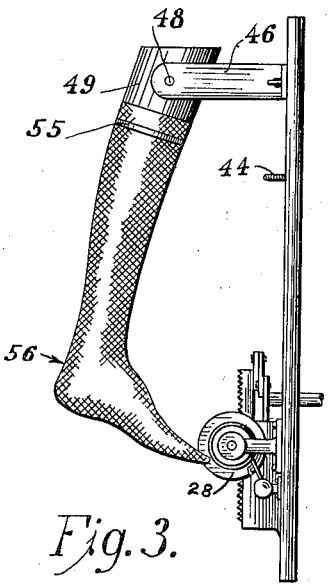
Figure 3 represents a side elevational view of the same.
Figure 2:
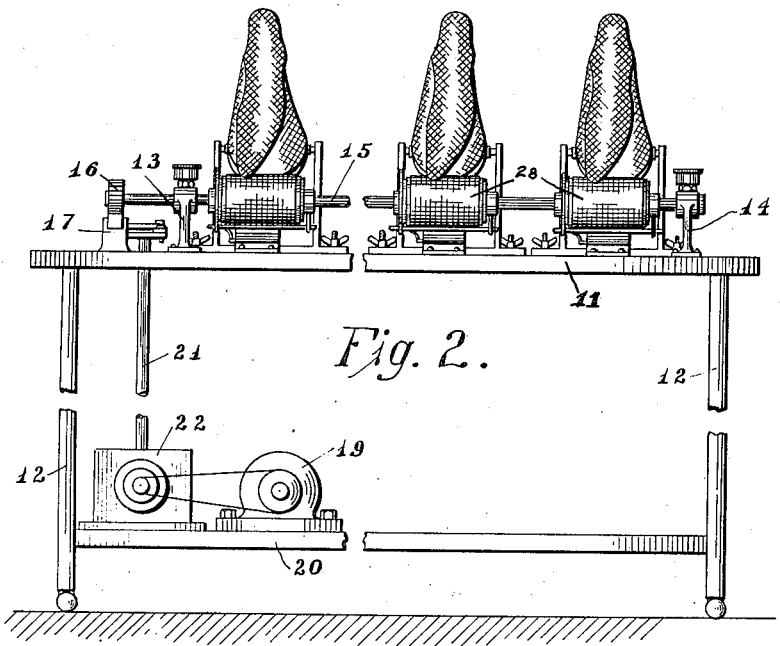
Figure 2 represents a front elevational view of the same.

In the embodiment of my invention shown in Figures 1, 2 and 3, I provide any suitable table 11 carried upon any suitable supporting structure such as the legs 12. Upon the table 11, I mount any suitable number of journal or bearing pedestals 13 and 14 in alignment with each other. Within the bearings of these pedestals, a shaft 15 is suitably journalled, having a pinion 16 at or near one end thereof. Generally transversely of the shaft 15, I provide a slide bearing or guide 17, within which a toothed rack 18 is slidably mounted, with the teeth thereof in mesh with the teeth of the pinion 16.

Any suitable source of power or prime mover, such as the electric motor 19 is provided at any suitable point in the apparatus, as for instance, upon a lower platform 20 carried by the legs 12. From the motor 19, a vertical drive shaft 21 is driven by any suitable means as for instance, any suitable reduction gearing, illustrated merely diagrammatically and represented by the numeral 22. The vertical drive shaft is suitably journalled at its upper end in the table 11 or in a bearing carried thereby, and is provided at its upper end with the eccentric pin 23, which may be carried in a terminal disc or crank plate 24 on the upper end of the vertical shaft 21. An arm 25 rigidly carried by the rack 18, is connected with the eccentric pin or crank pin 23 by any suitable connecting link or connecting rod 26, and the pin 27. By the rotation of the vertical shaft 21, the rack 18 is reciprocated to and fro in a straight line, within its guide 17, to the extent of the throw of the eccentric or crank pin 23. This reciprocation of the rack 18 is impressed upon the shaft 15 in the form of a rotary oscillation which is so arranged that it is less than 360°, that is, less than a complete revolution. Upon the shaft 15, any suitable number of abrasive drums or cylinders 28 are mounted. Each abrasive drum 28 consists of the end plates 29 and 30 having hub portions 31 and 32 which are locked or fixed to the shaft by suitable set screws 33 and 34 respectively, or by any other suitable means. Between the end plates 29 and 30, a wooden or other suitable cylindrical member 35 is coaxially disposed and held in place by any suitable retaining means or fastening means, such as the screws 36 or other equivalent means, as for instance, a flange, bolts, or the like.

An eyelet 37 is provided at one end of the cylinder, as for instance, in the manner shown in Figures 6 and 7, with the eyelet in registration with the surface of the cylinder. A loose or separable lock disc 38 having a central opening 39, is provided at one end of the cylinder. The central opening 39 is of a size either to fit neatly around the shaft 15, or to fit around the hub 31 of the end member 29. A more or less circular and concentric or slightly spiral slot 40 is also provided in the disc 39, opening into a generally radial and continuing slot 41. The concentric circular slot 40 is disposed generally at the same radial distance from the center as the eyelet 37. The abrasive material, as for instance, the duck, canvas, or other more or less abrasive material, is then wrapped around the drum 35 with the ends overlapping each other, as indicated at 42, and a retainer wire 43 is inserted into the eyelet and then into the slot 41 and 40, and the disc 38 turned until the end of the wire is well within the circular slot 40. If desired, a slight groove may be provided in the surface of the cylinder between its two ends and in alignment with the eyelet 37, into which the abrasive fabric or other abrasive material may be pressed by the wire 43 for firmer clamping of the same to the drum. If desired also, a slight variation in radius may be provided between the receiving end of the curved slot 40 and the inner end thereof, so that a slight camming action will be exerted upon the wire.

The wire is so positioned that it will always remain clear of the test points of the hose. This is effected by not permitting the cylinder to oscillate through a complete revolution.

Upon the table 11, I provide two sets of screws in alignment with each drum, as for instance, the screws 44 and the screws 45.

Corresponding to each abrasive drum, I also provide a pedestal 46 held in place by either the near set of screws 44 or the far set of screws 45 and suitable fastening means such as the wing nuts 47. Upon a generally horizontal pivot pin 48 carried by the upright portions of the pedestals 46, the leg form 49 is pivotally mounted. The leg form 49 is preferably a generally light hollow structure, preferably formed of celluloid or the like, having a pivot block 50 in the upper end thereof, with a pivot opening 51 extending therethrough, and being preferably covered with a suitable fabric covering 52 at the toe and at the heel portions thereof, and may also be weighted at any suitable point, as for instance in the toe, by means of a metallic weight 53 inserted. This weighting, however, depends upon the amount of contact pressure desired in the test. Upon the form 49, the hose 54 is mounted, as shown in Figures 4 and 5, held in place by an elastic band 55. In testing the toe, the pedestals or brackets 46 are moved back into the positions shown in Figures 1 and 3; while in testing the heel, the pedestals 46 are moved forward onto the bolts or fasteners 44, and made fast thereon, and the pedestal is simultaneously turned around so that the heel portion generally indicated by the arrow 56 will be in tangential contact with the abrasive drum.

A counter 57 is provided in operative relation to each drum 28 with the arm 58 thereof projecting into line either with the end of the wire 43 or with some other projection especially provided for the purpose on the locking disc 38, so that with each complete oscillation of a drum, the counter is moved once. By standardizing any particular fabric or other material to be used as the abrasive, authoritative standards for hosiery may be established by this means;—the end-point of the test being the point at which the fabric of the hose has been worn through.

In Figure 8, I have illustrated a modified embodiment of my invention, wherein two opposite shafts 15 and 15—a are provided in generally parallel relation to each other, and between which a pivot shaft 59 is provided upon suitable pedestals 60 for supporting a series of hosiery mounting members 49. Each hosiery mounting member 49 may be held in place upon the common pivot 59 by lock collars 61, which prevent the lateral displacement of the hosiery mounting members upon the common pivot 59. The shaft 15 is spaced slightly closer to the pivot shaft 59 than the shaft 15—a, so that when the hosiery mounting members 49 are swung into the left position shown in Figure 8, the heel test point indicated by the arrow 56 will be placed into tangential contact with the abrasive drums on the shaft 15. While the hosiery mounting members are turned into the opposite position shown on the right side of Figure 8, the toe will be brought into contact with the opposite abrasive drums.

By this means, the re-location and the reversal of the pivots 48 and pedestals 46 become unnecessary when changing from toe test to heel test or vice versa.

In the modifications of my invention shown in Figures 1, 2, 3 and 8, the contact pressure is established primarily by gravity, and by the weight of the hosiery mounting or supporting member.

Figure 9:
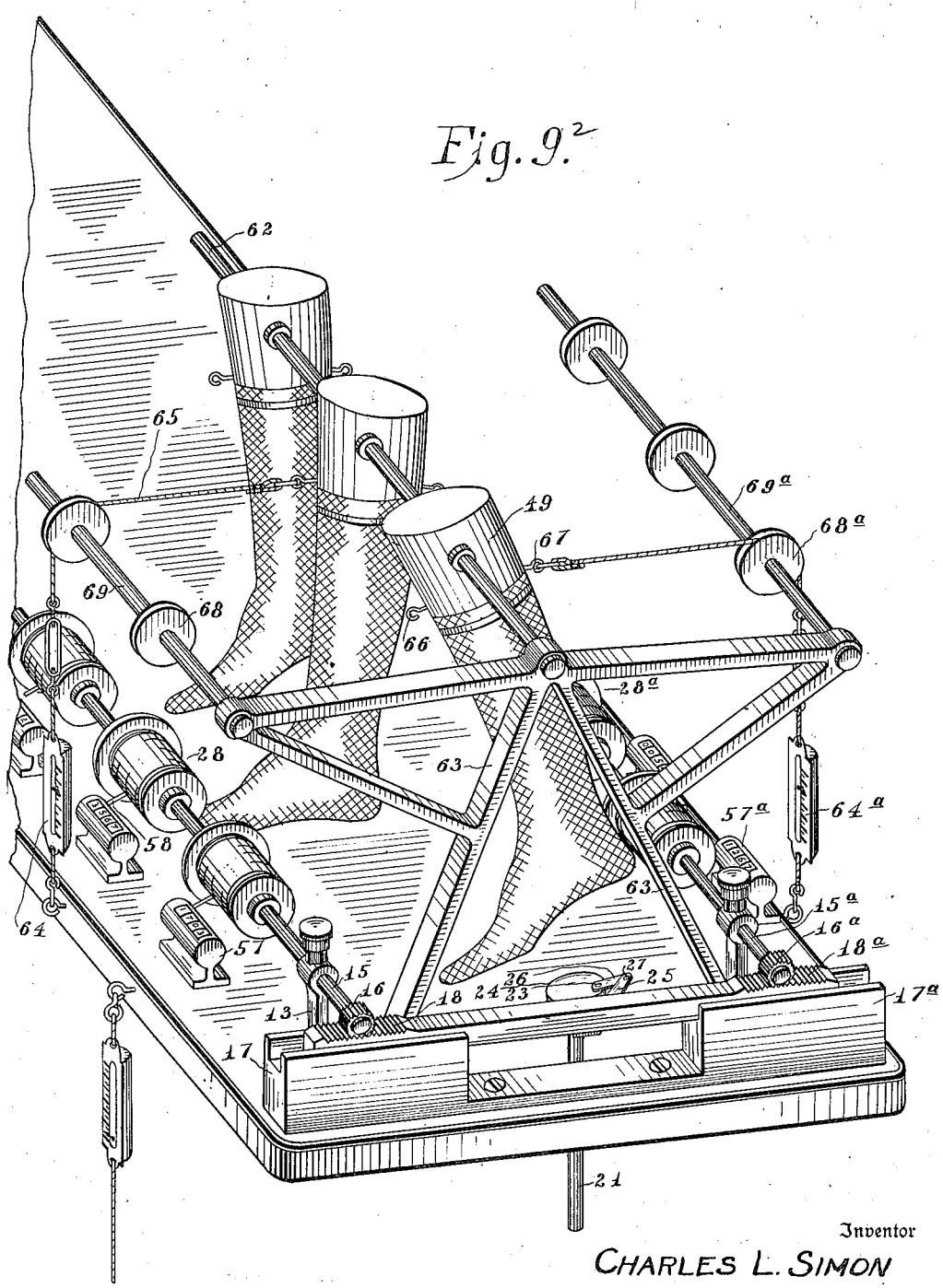
Figure 9 represents a perspective view of a still different embodiment of my invention.

In Figure 9, I have shown another embodiment of my invention, wherein a pivot shaft 62 is mounted substantially higher than the shafts 15 and 15—a, upon any suitable supporting structures 63, and whereby the hosiery mounting or supporting members 49 are held in a generally pendent position for both the heel-test as well as the toe-test. If desired, in this embodiment of my invention, I may produce the contact by means of spring tension provided by suitable dynamometers 64 and 64—a connected by flexible cords 65, cables, or the like, to suitable eyelets 66 and 67, carried by the hosiery mounting or supporting members. The cords or cables 65 are preferably passed over free pulleys or sheaves 68 and 68—a carried by common pivot shafts 69 and 69—a. By varying the length of the line 65, as for instance, by a turn buckle, or by a series of attaching rings or the like, the tension may be varied for different tests, as may be desired, or if desired, the tension may be maintained constant for all tests. In this embodiment of my invention, only one line is attached for the heel test, and only one line is attached for the toe test (the other lines being detached from the eyelets 66 and 67).

I am aware that my invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I hereby claim as new and desire to secure by Letters Patent, is:

1. A hosiery testing machine including an oscillatory shaft, an abrasive drum mounted thereon, means for oscillating said shaft and drum through oscillations less than a revolution to present an oscillatory abrasive surface, a hosiery supporting member adapted to receive hosiery with a test point in a more or less snug condition and having a portion engaged with and backing said test point, means for supporting said hosiery supporting member at a point spaced from the test points of the hose, and for permitting the hosiery supporting member to be deflected about said support into contact with the oscillatory abrasive member; said hosiery supporting member being maintained, gravitationally, in a generally stationary condition in contact with said abrasive drum.

2. A hosiery testing machine including a hosiery-supporting member adapted to receive hosiery in a mounted condition and having a portion engaged with and backing the hosiery at a test point, means for supporting said hosiery-supporting member in either one of a plurality of operative positions, an oscillatory shaft having a generally circular abrasive surface thereon in operative relation to said hosiery supporting member, means for oscillating said shaft, and means for maintaining a generally uniform contact between a test point of the hosiery on said hosiery-supporting member and said abrasive surface, while said hosiery-supporting member is generally in a stationary condition.

3. A hosiery testing machine including an oscillatory shaft, an abrasive drum mounted thereon, means for oscillating said shaft and drum through oscillations less than a revolution, a hosiery supporting member adapted to receive hosiery with a test point in a more or less snug condition and having a portion engaged with and backing the hosiery at a test point, means for supporting said hosiery supporting member at a point spaced from the test points of the hose, and for permitting the hosiery supporting member to be deflected about said support into contact with the oscillatory abrasive member; said hosiery supporting member being maintained gravitationally, in a generally stationary condition in contact with said abrasive drum, and means for measuring the number of oscillations.

4. A hosiery testing machine including a hosiery-supporting member adapted to receive hosiery in a mounted condition and having a portion engaged with and backing the hosiery at a test point, means for supporting said hosiery-supporting member in either one of a plurality of operative positions, an oscillatory shaft having a generally circular abrasive surface thereon in operative relation to said hosiery-supporting member, means for oscillating said shaft, and means for maintaining a generally uniform contact between the test point of the hosiery on said hosiery-supporting member and said abrasive surface, while said hosiery-supporting member is generally in a stationary condition, and means for measuring the number of oscillations.

5. A hosiery testing machine including a hosiery supporting member adapted to receive hosiery in a mounted condition and having a fabric backing therefor at a test point, means for supporting said hosiery supporting member in either one of a plurality of operative positions, an oscillatory shaft having a generally curved abrasive surface thereon in operative relation to said hosiery supporting member, means for oscillating said shaft, and means for maintaining a generally uniform contact between the hosiery on said hosiery supporting member and said abrasive surface, while said hosiery supporting member is generally in a stationary condition.

6. A hosiery testing machine comprising a hosiery form adapted to support hose with a test point thereof in substantially the shape of actual use and providing a backing for the hose at said point, a pivot mounting the form, a rotatable abrasive drum positioned to be engaged by said test point, and means for oscillating said drum.

7. A hosiery testing machine comprising a hosiery form adapted to support hose with a test point thereof in substantially the shape of actual use and providing a backing for the hose at said point, a pivot mounting the form, a rotatable abrasive drum positioned to be engaged by said test point, means for oscillating said drum, and means for maintaining said form and drum in yieldable contact with each other.

8. A hosiery testing machine comprising a hosiery form adapted to support hose with a test point thereof in substantially the shape of actual use and providing a backing for the hose at said point, a pivot mounting the form, a rotatable abrasive drum positioned to be engaged by said test point, means for oscillating said drum, and means for maintaining said form and drum in yieldable contact with each other, said last named means being adjustable to vary the pressure of the form on the drum.

9. A hosiery testing machine comprising a hosiery form adapted to support hosiery in generally normal condition as in actual use, movable abrasive means presenting a generally curved surface to the hosiery form and moving about a center generally the same as the center of said curved surface, said hosiery form being capable of being selectively presented for yieldable contact with said abrasive means at the heel and toe portions thereof, respectively, and being generally stationary, and means for maintaining said abrasive means and said hosiery form in yieldable contact with each other.

CHARLES L. SIMON.